United States Patent [19]

Knights

[11] 4,339,839
[45] Jul. 20, 1982

[54] WINDSCREEN WIPERS

[75] Inventor: Robert E. Knights, Derby, England

[73] Assignee: Knights, Brooks and Partners Limited, Spondon, England

[21] Appl. No.: 130,297

[22] Filed: Mar. 14, 1980

[30] Foreign Application Priority Data

Mar. 23, 1979 [GB] United Kingdom ................. 7910270

[51] Int. Cl.³ ............................ B60S 1/46; B60S 1/38
[52] U.S. Cl. .............. 15/250.04; 15/250.36; 15/250.41; 15/250.42
[58] Field of Search .......... 15/250.04, 250.09, 250.36, 15/250.4–250.42

[56] References Cited

U.S. PATENT DOCUMENTS 2,918,689 12/1959 Pruett ............................. 15/250.04
3,879,794 4/1975 Roberts, Jr. .................... 15/250.42
3,919,736 11/1975 Bourassa et al. ............... 15/250.42
3,939,524 2/1976 Knights ......................... 15/250.04
4,060,872 12/1977 Bucklitzsch .................... 15/250.04

Primary Examiner—Peter Feldman
Attorney, Agent, or Firm—Alan H. Levine

[57] ABSTRACT

A windscreen wiper comprises a carrier adapted for mounting on a windscreen wiper arm and for supporting a pair of spaced parallel wiping lips which, in use, together with the windscreen surface bound a space into which cleaning fluid can be introduced and a brush or plastics material step device in said space, the cross-sectional area of the carrier being constant throughout its length.

16 Claims, 8 Drawing Figures

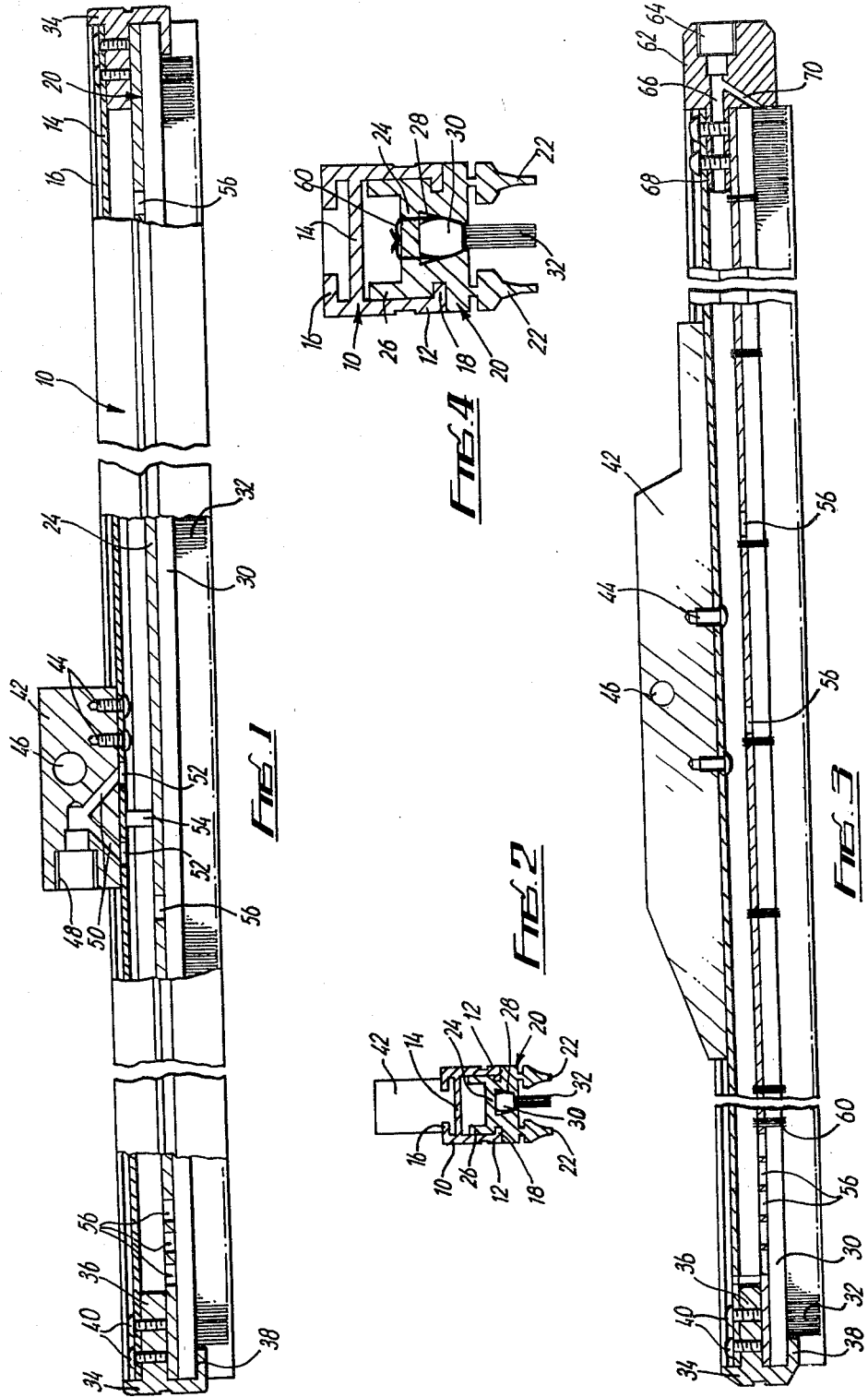

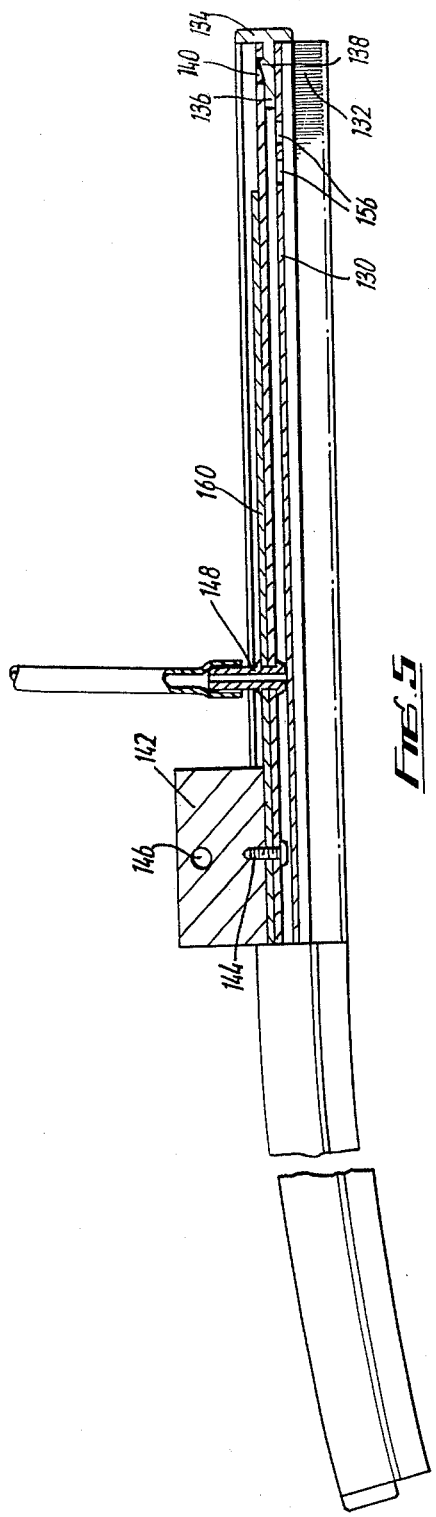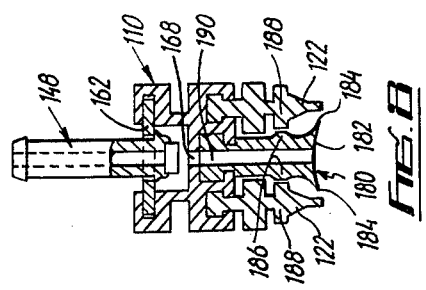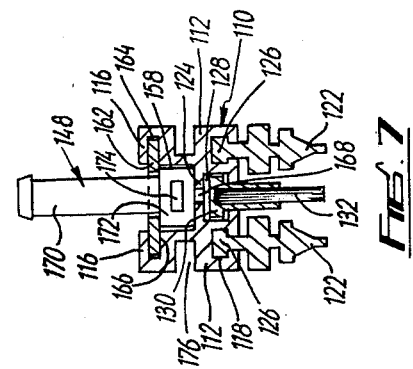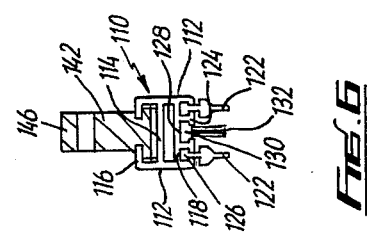

WINDSCREEN WIPERS

The invention relates to windscreen wipers.

There are known windscreen wipers which comprise a reciprocable arm, a rigid blade carrier mounted on the arm and in turn supporting an assembly comprising a blade element including a pair of generally parallel spaced lip members adapted to engage a windscreen surface so that the blade element encloses a hollow space which is closed in use by the windscreen and a plurality of brush members arranged in spaced relationship in two parallel rows, the brush members of one row being staggered with respect of those of the other, and conduit means for supplying cleaning fluid to the said hollow space.

Such an arrangement has proved relatively complicated and expensive to manufacture and involved the use of a plurality of components, for example spring means to maintain the wiping lips and brushes of the assembly in contact with the windscreen.

It is one object of the present invention to obviate or mitigate the disadvantages of such prior windscreen wipers.

According to the present invention there is provided a windscreen wiper including a blade carrier supporting flexible blade arrangement which includes a pair of generally parallel spaced lip members adapted to engage a windscreen surface so that the members bound a hollow space which is closed in use by the windscreen, at least one conduit for cleaning fluid communicating with the said hollow space and a flexible device mounted in the hollow space so as in use to be in contact with the surface of the windscreen between the lips, the blade carrier having a constant cross-section along its length.

The blade carrier may be manufactured by extrusion to provide a constant cross-section.

Preferably the blade carrier has two side members and a cross member and each side member at its base may have an inwardly directed flange adapted to be accommodated in a longitudinal groove formed in a side of a blade assembly comprising said two lips and a cross member in which said device may be mounted. Alternatively the two side members may be interconnected adjacent to their base by a further cross member which may be provided with longitudinally extending recesses for accommodating two separate lips of a blade assembly, and a further recess for accommodating the brush.

Preferably said conduit means include a longitudinally extending passage defined by the side and cross members of the carrier and the cross member of the blade assembly or by the cross members of the carrier. To provide for communication between the said space and the windscreen surface passages may be provided through the cross member of the blade assembly or the cross member of the blade carrier.

The side members of the blade carrier may have inwardly directed flanges at their upper ends which can be accommodated in grooves formed in a mounting block adapted to be attached to the wiper arm.

Preferably end caps are provided for fitment to each end of the blade carrier.

The blade carrier is preferably formed from a rigid material, for example aluminium, or from a resilient material, for example polyvinyl chloride. A wiper including a rigid carrier is suitable for use on flat windscreens whereas a wiper including a resilient carrier is suitable for use on flat and curved windscreens.

Where the wiper is intended for use on curved windscreens the resilient blade carrier is preferably provided with a leaf spring to bias the wiper into a curved configuration, the curvature of which is greater than the curvature of the windscreen to be wiped. Alternatively a windscreen wiper for a curved windscreen may be connected to the wiper arm at two points adjacent its ends or by articulating members.

Various means can be employed for directing cleaning fluid to said space, for example, the conduit may be connected to the mounting block for the wiper, the block being provided with through passages. The space may be divided into two by a transversely extending partition and a passage in the block may lead to each space. Alternatively the conduit may be connected to an end cap provided with passage means communicating with said space.

The passages through the said second cross member or the cross member of the blade assembly may be positioned at various points depending upon the desired location of the supply of cleaning fluid to the windscreen; for example the passages may be formed adjacent the ends of the wiper and/or adjacent the centre thereof. In the arrangement where the conduit is connected to an end cap an additional passage may be provided in the end cap to supply cleaning fluid to the windscreen immediately adjacent the end cap.

Preferably the flexible device is a brush having a continuous flexible spine.

The brush may be mounted on the blade assembly or directly on the blade carrier. It is preferable that the spine of the brush has a width greater than the bristle portion thereof whereby the spine may be accommodated in a continuous recess formed in the blade assembly or the blade carrier. In certain instances, especially where the brush is carried by the blade assembly it is fixed in position by stitching.

The flexible device in another embodiment of the invention may be a plastics member having a relatively low co-efficient of friction and being adapted to bear the main load exerted by the wiper arm arrangement means on the windscreen.

Embodiments of the present invention will now be described by way of example only with reference to the accompanying drawings in which:

FIG. 1 and FIG. 2 show a side elevation partially in section and a cross-sectional end elevation respectively of a windscreen wiper;

FIGS. 3 and 4 respectively show corresponding views of a further windscreen wiper;

FIGS. 5 and 6 show respectively a partial sectional side elevation and sectional end elevation of a further windscreen wiper; and FIGS. 7 and 8 show cross-sections of two modified windscreen wipers.

The windscreen wiper shown in FIGS. 1 and 2 comprises a blade carrier 10 which is a length of extruded aluminum alloy having a constant cross-section throughout its length and comprises a pair of spaced parallel side members 12 and a cross member 14. Each side member 12 has an inwardly directed flange 16, 18 at its top and base respectively, the flanges 18 being accommodated in longitudinally extending grooves formed in a rubber-like blade assembly 20 which comprises two spaced parallel wiper lips 22 and a cross member 24, the cross member having upturned flanges 26 to sealingly engage with the inside surfaces of the side member 12. A re-entrant recess 28 is formed along the underside of the cross member 24 intermediate the lips 22.

A plastics material brush assembly is supported in said recess 28 and comprises a spine 30 and bristles 32, the width of the spine 30 being greater than the width of the bristles 32 such that, owing to the resilient nature of the blade assembly 20 after fitment of the brush spine into the recess 28 it is retained therein loosely enough to permit fluid flow around the spine to the bristles. It is desirable that the base of the lips 22 lie on a plane which is lower than the base of the bristles 32.

The wiper is provided at each end with end caps 34, (FIG. 1) which have tongues 36, 38 projecting inwardly therefrom accommodated respectively in the space between the cross member 14, 24 of the blade carrier and blade assembly respectively and the space between the lips 22 of the blade assembly, the bristles at the end of the brush assembly being cut away so that the tongue 38 overlies and provides an anchorage for the ends of the spine 30. End caps 34 are retained in position by screws 40 passing through holes formed in the cross member 14 of the blade carrier.

Mounting means are provided for mounting the windscreen wiper on a reciprocable arm, the means comprising a block 42 formed with longitudinally extending grooves in its sides in which grooves are accommodated the top flanges 16 of the blade carrier. The block is retained in position by screws 44 passing through the cross member 14 of the blade carrier from the underside and is provided with a mounting hole 46 for accommodating the attachment means of the wiper arm. The block includes also connecting means 48 for the end of a conduit intended to convey cleaning fluid to the windscreen wiper said means terminating in two passages 50 which, by way of holes 52 formed in the cross member 14 communicate with the space defined by the cross members 14, 24 of the blade carrier and blade assembly respectively and the side members 12 of the blade carrier. Conveniently a transverse partition 54 divides said space into two sections and a passage 50 leads to each section. Passages 56 are provided through the cross member 24 of the blade assembly to allow cleaning fluid from said space to pass into the longitudinal recess 28.

The windscreen wiper described with reference to FIGS. 1 and 2 is suitable for use for example on the flat windscreen of a locomotive. The arrangement of the passages 56 means that when the locomotive is stationary or travelling slowly cleaning fluid supplied to the passages 56 at the top and middle of the wiper in its in use position may flow by gravity down the windscreen such that the entire windscreen surface is wetted. On the other hand when the locomotive is travelling at speed washing fluid discharged through the passage 56 at the bottom and middle of the wiper is induced by the air flow over the windscreen to travel upwardly over the windscreen once again to ensure that the entire windscreen surface is wetted.

The embodiment of the invention illustrated in FIGS. 3 and 4 is similar to that described with reference to FIG. 2 and as a result similar components have been given the same reference numerals in the drawing and will not now be described in further detail.

The embodiment illustrated in FIGS. 3 and 4 is intended for use on flat windscreens subjected to high speeds, for example on an aircraft. As a result the mounting block 42 is of different design from that shown in FIG. 1 but, with the exception of the fluid passages is in all other major respects similar. The cleaning fluid supply means is different and additional means for ensuring retention of the brush assembly in the blade assembly 24 are provided, these means comprising the bindings 60 which are stitched through the cross member 24 of the blade assembly and around the spine 30 of the brush.

In this embodiment cleaning fluid is supplied to a modified end cap 62 which is provided with conduit connection means 64 and a main passage 66 through its tongue 68, this main passage communicating with the space defined by the cross-members 14 and 24 and the side members 12. A pair of additional passages 70 lead from the main passage 66 to the space defined by the lips 22 and the cross member 20 of the blade assembly on each side of the brush.

In contrast to the wiper shown in FIGS. 1 to 4 the wiper shown in FIGS. 5 and 6 is intended for use on a curved surface, for example a car windscreen or a headlamp glass. In this embodiment the extruded blade carrier 110 is formed from a flexible plastics material and includes spaced parallel side members 112 inwardly directed top flanges 116 and first and second cross members 114, 124. The wiper includes also two separate rubber-like wiping lips 122 each having a bead 126 at its upper end which is accommodated in a re-entrant groove 118 formed in the extrusion. A further re-entrant groove 128 is formed in the carrier midway between the grooves 118 to accommodate the spine 130 of a brush 132. The wiper is mounted by a block 142 having a mounting hole 146 and being fixed to the blade carrier by a screw 144.

Two end caps 134 are provided for the blade carrier each having a tongue 136 of a cross section corresponding to the cross section of the space defined by the cross members 114 124 and the side members 112 of the blade carrier and having on its upper surface a detent catch 138 which is accommodated in a hole 140 formed in the cross member 114 adjacent the end of the carrier.

A conduit connector member 148 is manufactured from plastics material and snap fitted into a hole formed through the cross member 114 adjacent the block 142. Thus the conduit communicates with the space defined by the cross members 114, 124 and the side members 112. To provide a passage for cleaning fluid to the space between the wiping lips 122 passages 156 are formed through the cross member 124 and communicate with the longitudinally extending groove 128.

It has been stated above that the windscreen wiper shown in FIGS. 5 and 6 is suitable for use on curved windscreens and to enable it to conform to the curve of the windscreen a leaf spring 160 having a curvature greater than the greatest curve of the windscreen to be wiped is placed on the upper surface of the cross member 114 and retained in position by the block 142 and also by the conduit connector 148. The spring causes the wiper to curve as shown in the left hand of FIG. 5. Consequently if the blade is placed against a curved windscreen and there is no pressure extended thereon from the wiper arm it will make point contact at its ends. If the pressure towards the windscreen exerted by the arm is sufficient the wiper will deflect against the influence of the spring 160 to conform to the curve of the windscreen and as the arm moves the wiper across the windscreen and the curve varies the flexibility of the wiper and resilience of the spring will enable it to conform to this curve at all positions.

The wiper shown in cross-section in FIG. 7 is generally similar to that shown in FIG. 5 and 6 but the extruded carrier 110 of plastics material has a modified cross-section. Those components in FIG. 7 similar to those in FIGS. 5 and 6 will be given the same reference numerals.

This carrier 110 has three T-shaped grooves in its bottom face for accommodating the two spaced wiper lips 122 and the intermediate brush 132. A longitudinally extending channel 158 is defined by the side walls 112 and the cross-member 124, is closed off at its ends by end caps snap fitted to the carrier and at its top by a top member 162 slid into opposed grooves 164 defined by the flange 116 and a seating ledge 166. The edges of the top member are a fluid-tight sliding fit in the grooves 164 and thus a passage for cleaning fluid is provided in the carrier, communication between the carrier and the space between the wiper lips 122 being provided by holes 168 formed through the cross member 124 at strategic positions. The top member 162 serves also to mount the conduit connector member 148 which has a spigot section 170 and a block section 172 having a passage 174 therethrough, the block section 172 being so dimensioned that it is trapped in the passage 158 by the top member 162.

The top member may be relatively rigid and a wiper including such a member is suitable for use on a flat screen, and for curved screens a resilient metal or plastics top member having a predetermined curvature is employed.

The carrier is provided also with a groove 176 running along each side member. These grooves are intended to accommodate fingers of mounting means (not shown) for connecting the wiper to its arm. In curved screen wipers the fingers may slide along the grooves on changes in curvature of the wiper.

It will be realised that by employing a carrier of constant cross-section, a single extrusion can be employed for a wide range of wipers, for example of varying length and mountings.

The embodiment illustrated in FIG. 8 is primarily intended for use on windscreens manufactured from relatively soft materials, for example clear plastics materials such as those employed in helicopters.

In this embodiment the carrier, wiping lips, conduit connector member and top member are similar to those illustrated in FIG. 7 and will be allocated the same reference numerals. The brush 132 is, however, replaced by a flexible device 180 formed from a plastics material having a low co-efficient of friction.

The base 182 of the device 180 is concave and the faces of its lower portion are flared outwardly such that knife edges 184 are formed at the intersections between the faces and the base. In the assembled condition the base of the device 180 is spaced slightly above the plane containing the tips of the wiping lips 122. Protrusions 186 are formed on the side faces of the device 180 and, in an assembled wiper are located at the same level as an enlarged thickness portion 188 of the lips 122 such that, in use, as the wiper moves across a windscreen the portions 188 abut the protrusion 186 to control the lateral pivotting of the lips.

As in the embodiment illustrated in FIG. 7, cleaning fluid is supplied through holes 168 which communicate with corresponding passages 190 provided through the device 180, these passages terminating in the base 182.

The windscreen wiper is mounted in the manner described above, for example, on a reciprocating mechanism with resilient means to urge the lips 122 and plastic device 180 into engagement with the windscreen. It will be realised that the plastics device bears the load exerted by said resilient means on the windscreen and only a small surface area of the lips contacts the windscreen, this area being considerably less than that encountered with conventional wiping lips. Consequently the wear of the plastics windscreen is considerably reduced. Furthermore the washing action of the washing fluid loosens dirt and grit particles from the windscreen and consequently reduces the tendency for these to increase the scratching action. The knife edge formation at the junction between the base and faces of the plastics device serves also to loosen and remove debris, for example insects, from the windscreen surface, thus increasing the cleaning action of the windscreen wiper while reducing the tendency to scratch.

Various modifications can be made without departing from the scope of the invention. For example the mounting means for the flexible wiper illustrated in FIG. 5 need not be central but can be arranged at each end of the wiper. In this modification the spring 160 may be omitted so that when a load is exerted on the end mountings in the direction of the windscreen the central portion of the wiper between the mountings is free to deflect and conform to the curvature of the windscreen. The end mountings may be bows mounted at their centres to a further bow in turn mounted at its centre to the wiper arm. The end mounting bows may be adapted for use with wipers having the cross section shown in FIGS. 7 and 8 and thus at their ends have inwardly directed fingers projecting into the grooves 176 in the side walls 112. The end caps in this case have enlarged end flanges to retain the fingers in the grooves.

In the embodiment of FIG. 8 the plastics device 180 can be provided in short lengths. Any suitable cleaning fluid connector means and end cap mounting means may be utilised.

I claim:

1. A windscreen wiper comprising:
   an elongate blade carrier,
   a flexible blade arrangement mounted on the carrier, the blade arrangement including a pair of longitudinally extending parallel spaced resilient lip members adapted to engage a windscreen surface so as to bound a hollow space which is closed in use by the windscreen,
   at least one conduit for cleaning fluid communicating with said space, and
   a longitudinally extending resilient screen scrubbing arrangement mounted in the hollow space between but spaced from the lip members, the scrubbing arrangement when in use contacting the windscreen surface,
   the blade carrier, the blade arrangement, and the scrubbing arrangement each having a constant cross-section along its entire length, a recess in one of the blade carrier and blade arrangement for accommodating the scrubbing arrangement,
   the blade arrangement and the scrubbing arrangement each being uniformly longitudinally flexible at all points along its length.

2. A windscreen wiper as claimed in claim 1, in which the blade carrier is an extruded element.

3. A windscreen wiper as claimed in claim 2, in which the blade carrier is uniformly longitudinally flexible at all points along its length.

4. A windscreen wiper as claimed in claim 1, in which the blade carrier has two side members and a cross member, each side member at its base having an inwardly directed flange adapted to be accommodated in a longitudinal groove formed in a side of the blade assembly, and the blade assembly comprises said two lips and a cross member in which a back portion of the scrubbing arrangement is mounted.

5. A windscreen wiper as claimed in claim 1, in which the blade carrier has two side members and a cross member and respective recesses in one face thereof to accommodate two separate lip members of the flexible blade arrangement and to accommodate said scrubbing arrangement.

6. A windscreen wiper as claimed in claim 4, in which said conduit includes a longitudinally extending passage defined by the side and cross members of the carrier and the cross member of the blade assembly.

7. A windscreen wiper as claimed in claim 5, in which said conduit means includes a longitudinally extending passage defined by the side and cross members of the carrier and a top member accommodated at its edges in inwardly facing grooves in said side members.

8. A windscreen wiper as claimed in claim 6, in which passages are provided through said cross member bounding said hollow space.

9. A windscreen wiper as claimed in claim 7, in which said top member is rigid.

10. A windscreen wiper as claimed in claim 7, in which said top member is resilient.

11. A windscreen wiper as claimed in claim 1, in which said scrubbing arrangement is a brush extending along substantially the entire length of the space and having a continuous flexible spine.

12. A windscreen wiper as claimed in claim 1, in which said scrubbing arrangement is a continuous flexible plastic material bearing member adapted to bear the main loads exerted on the wiper.

13. A windscreen wiper as claimed in claim 12, in which the bearing member is provided with a concave depression in its face engaging the windscreen, such that it makes contact therewith along two spaced lines, and the outside faces of the member in the vicinity of the face are inclined outwardly such that the edges between the base and the faces have knife-edge configurations.

14. A windscreen wiper as claimed in claim 13, in which passage means for cleaning fluid extend through said bearing member and terminate in said concave depression.

15. A windscreen wiper as claimed in claim 6, in which said longitudinally extending passage is divided into two parts by a transversely extending partition, whereby each part may receive a separate supply of cleaning fluid.

16. A windscreen wiper as claimed in claim 1, in which an end cap carried by the carrier has cleaning fluid connection means formed therein leading to the conduit.

* * * * *